United States Patent
Boilard et al.

(10) Patent No.: US 9,952,630 B2
(45) Date of Patent: Apr. 24, 2018

(54) POWER SYSTEM INCLUDING A COUPLING MECHANISM

(71) Applicant: GOOGLE INC., Mountain View, CA (US)

(72) Inventors: Joshua Boilard, San Frandisco, CA (US); Prashant Patel, Cupertino, CA (US); Jeffrey Hayashida, San Francisco, CA (US); Warren Jones, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/811,337

(22) Filed: Jul. 28, 2015

(65) Prior Publication Data
US 2016/0054760 A1 Feb. 25, 2016

Related U.S. Application Data

(60) Provisional application No. 62/041,629, filed on Aug. 25, 2014.

(51) Int. Cl.
| | |
|---|---|
| *G06F 1/16* | (2006.01) |
| *H01R 31/06* | (2006.01) |
| *H01R 35/04* | (2006.01) |

(52) U.S. Cl.
CPC ........... *G06F 1/1679* (2013.01); *H01R 31/06* (2013.01); *H01R 35/04* (2013.01)

(58) Field of Classification Search
CPC ......... G06F 1/16; G06F 1/1679; H01R 31/06; H01R 35/04

USPC .................................................... 361/679.57
See application file for complete search history.

(56) References Cited

U.S. PATENT DOCUMENTS

| | | | |
|---|---|---|---|
| 5,510,691 A | 4/1996 | Palatov | |
| 6,046,921 A | 4/2000 | Tracewell et al. | |
| 6,328,581 B1 * | 12/2001 | Lee ......... | H01R 31/06 439/106 |
| 6,747,859 B2 | 6/2004 | Walbeck et al. | |
| 7,001,196 B1 * | 2/2006 | Huang .......... | H01R 35/04 439/131 |
| 7,133,278 B2 | 11/2006 | Amdahl et al. | |
| 8,079,877 B1 | 12/2011 | Lai et al. | |
| 8,079,887 B2 | 12/2011 | Lai et al. | |
| 8,213,204 B2 | 7/2012 | Lanni | |

(Continued)

FOREIGN PATENT DOCUMENTS

WO 2016/032689 A1 3/2016

OTHER PUBLICATIONS

International Search Report and Written Opinion from corresponding application PCT/US2015/043173, dated Oct. 6, 2015, 10 pages.

*Primary Examiner* — Dion R Ferguson
*Assistant Examiner* — Mandeep S Buttar
(74) *Attorney, Agent, or Firm* — Brake Hughes Bellermann LLP

(57) ABSTRACT

In one general aspect, an apparatus can include a base component including a keyed mount receptacle, and a power component including a keyed mount configured to be inserted into the keyed mount receptacle. The power component can be configured to be lockably coupled to the base component when the power component is rotated with respect to the base component.

18 Claims, 20 Drawing Sheets

(56) References Cited

U.S. PATENT DOCUMENTS

| | | |
|---|---|---|
| 8,308,496 B2* | 11/2012 | Youssefi-Shams .... H01R 13/44 439/172 |
| 8,414,318 B1 | 4/2013 | Chen |
| 8,708,722 B1* | 4/2014 | Walliser ............. H01R 13/6675 439/172 |
| 2009/0227122 A1* | 9/2009 | Jubelirer .............. H01R 31/065 439/11 |
| 2014/0094065 A1 | 4/2014 | Martin et al. |
| 2016/0056600 A1* | 2/2016 | Liao ....................... H01R 35/04 439/131 |

* cited by examiner

POWER SYSTEM INCLUDING A COUPLING MECHANISM

CROSS REFERENCE TO RELATED APPLICATION

This application is a Nonprovisional of, and claims priority to, U.S. Patent Application No. 62/041,629, filed on Aug. 25, 2014, entitled "Power System Including a Coupling Mechanism", which is incorporated by reference herein in its entirety.

TECHNICAL FIELD

This description generally relates to computing devices. The description, in particular, relates to providing power to a computing device.

BACKGROUND

A computing device can be portable and can operate on power provided by a rechargeable battery. A computing device additionally, or in the alternative, can operate on power provided by a power converter (sometimes referred to as a power brick). The power converter converts power received by plugging one part of the power converter into an alternating current (AC) receptacle ("the wall") into direct current (DC) power at a voltage that is used by the computing device and provided to the computing device using another connector or adapter that can plug into a receptacle provided on the computing device. In some cases, the DC power can also charge/recharge the battery while providing power to the computing device. The power adapter can convert (adapt) the voltage (110/220 Volts) of the power received from the alternating current (AC) receptacle ("the wall") to the voltage required by the computing device.

SUMMARY

In one general aspect, an apparatus can include a base component including a keyed mount receptacle, and a power component including a keyed mount configured to be inserted into the keyed mount receptacle. The power component is configured to be lockably coupled to the base component when the power component is rotated with respect to the base component.

Example implementations may include one or more of the following features. For instance, the keyed mount can include a spring contact configured to contact a terminal included in the base component when the power component is rotated with respect to the base component. The keyed mount can include a third contact configured to contact a ground terminal included in the base component when the power component is rotated with respect to the base component. The third contact can be a center contact. A first connector included in a first end of a cable can be coupled to a device receptacle included in a computing device. A second connector included in a second end of the cable can be coupled to the base receptacle. The keyed mount can be coupled to a first side of the power component. The power component can include at least two prongs on a second side of the power component non-parallel to the first side of the component. The power component can have a triangular shape. The power component can be configured to rotate in a clockwise direction and with respect to the base component. The power component can be configured to rotate in a counterclockwise direction and with respect to the base component. The power component and the base component when fully coupled together can define a rectangular profile. The keyed mount can be coupled to a first end of the power component. A plug can be coupled to a second end of the power component. The plug can include three prongs.

In another general aspect, an system can include a cable including a first connector on a first end and a second connector on a second end, a base component including a base receptacle and keyed mount receptacle, and a power component including an keyed mount. The first end of the connector can be configured for coupling to a device receptacle. The second end of the connector can be coupled to the base receptacle. The keyed mount can be inserted into the keyed mount receptacle, lockably coupling the power component to the base component when the power component is rotated with respect to the base component.

Example implementations may include one or more of the following features. For instance, the keyed mount can be coupled to a first side of the power component. The power component can include at least two prongs on a second side of the power component non-parallel to the first side of the component. The base component can further include a first terminal, a second terminal, and a ground terminal. The keyed mount can include a first contact, a second contact, and a third contact. The first contact can contact the first terminal. The second contact can contact the second terminal. The third contact can contact the ground terminal. The first contact can be a first spring contact. The second contact can be a second spring contact. The third contact can be a center contact. The power component can rotate in a clockwise direction and with respect to the base component. The power component can rotate in a counterclockwise direction and with respect to the base component.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

In some cases, flexibility in connecting power to the computing device may be desirable for a user. For example, in the case of a laptop or notebook computer, the user may place the computing device on a table, desk, or other flat surface while the wall outlet (wall receptacle, AC power receptacle, or AC power outlet) that provides the needed AC power for a base component (also referred to as a power brick or power converter) may be located at a distance from the computing device. In these cases, one or more power components such as cables of varying lengths can be removably coupled to the base component and used to comfortably place the computing device on the desk or table while connecting the base component between a receptacle on the computing device and the wall outlet. In another example, a power component (which can be referred to as a duckhead) that includes prongs that plug into a wall outlet can be coupled directly to the base component without an intervening cable. The base component including the connected power component may then be placed between the wall outlet and the computing device, providing power to the computing device (e.g., recharging a battery included in the computing device) without the need for cables on two sides of the base component. In other cases, a user may use a combination of a cable and direct interface of the power converter to either the wall outlet or the computing device when providing power to the computing device.

Accordingly, a power system can be implemented that includes two components. One end or side of the base component can either directly connect to the computing device or can be connected to the computing device using a cable. In some cases, the other end or side of the base component can be coupled to an interlocking (or locked) power component that can be directly connected to the wall outlet. In other cases, the base component can be connected to the wall outlet using a cable.

Figure 1:
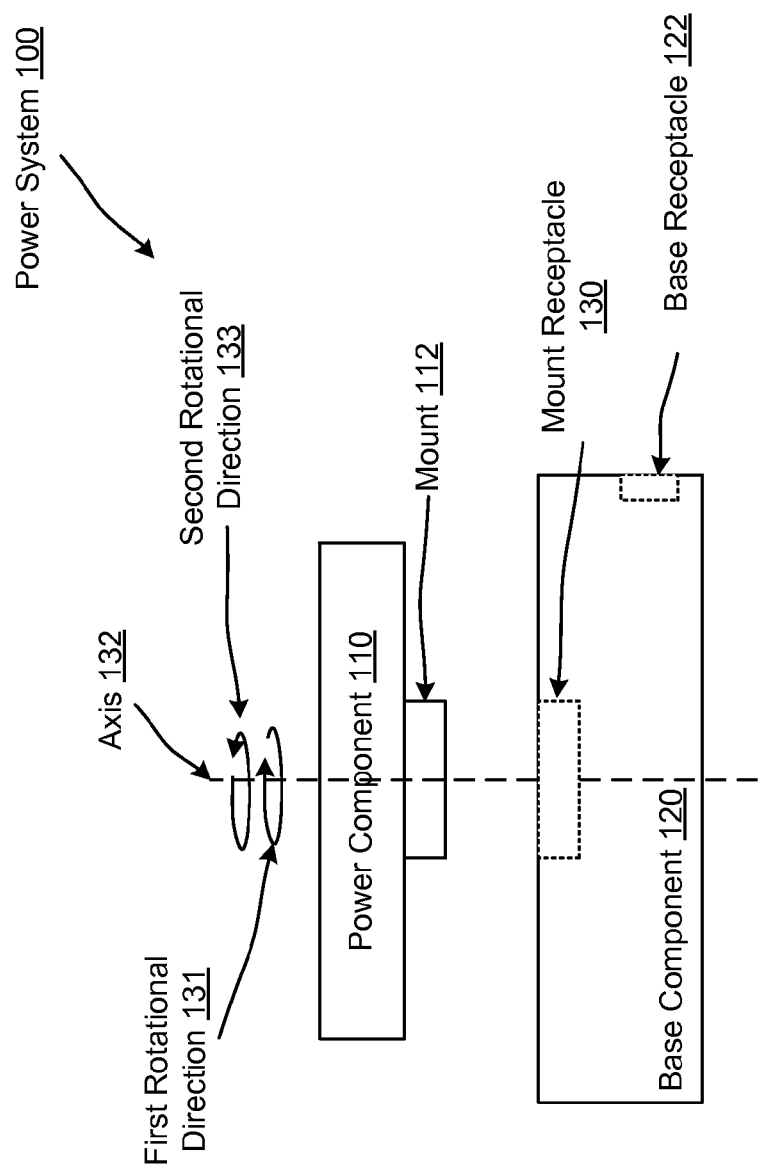
FIG. 1 is a block diagram of a power system that includes a power component that can be coupled to a base component.

FIG. 1 is a block diagram of a power system 100 that includes a power component 110 that can be coupled to a base component 120 (a power brick or power converter). The power component 110 includes a mount 112 that can be coupled to the base component 120 using a mount receptacle 130. The base component 120 can receive a variety of power components (e.g., power component 110). The mount 112 included in the power component 110 and the mount receptacle 130 included in the base component 120 provide a coupling mechanism for connecting any one of a variety of power components (e.g., the power component 110) to the base component 120. The mount 112 can have a protrusion or protruding portion (e.g., tab) that can be inserted into the mount receptacle 130, which defines at least a portion of an opening. This will be shown in more detail with reference to FIG. 5A.

The base component 120 also includes at least one base receptacle (e.g., base receptacle 122) for connecting to/interfacing with a receptacle included on a computing device (not shown in FIG. 1). This is shown in more detail in FIGS. 2A-B. Though shown on one side of the base component 120, the base receptacle 122 (or additional base receptacles) can be included on other sides and/or a bottom of the base component 120.

The power component 110 can be rotatably coupled to the base component 120. Placing the mount 112 within the mount receptacle 130 of the base component 120 and then rotating the power component 110 with respect to the base component 120 (e.g., rotating a certain amount) can operatively couple (attach) the power component 110 to the base component 120. The coupling adaptively connects components and circuitry included in the power component 110 to components and circuitry included in the base component 120. The mount 112 and the mount receptacle 130 can collectively be referred to as a coupling mechanism.

For example, as shown in FIG. 1, a first rotational direction 131 and a second rotational direction 133 (opposite the first rotational direction) of the power component 110 with respect to the base component 120 can be about an axis 132. The axis 132 can intersect the mount 112 and the mount receptacle 130. For example, the power component 110 can be rotated (e.g., rotated approximately 90 degrees, rotated more than 90 degrees, rotated less than 90 degrees) clockwise with respect to the base component 120 along the first rotational direction 131 to interlock (or lock) the power component 110 with the base component 120 (after the mount 112 has been inserted into the mount receptacle 130). In another example, the power component 110 can be rotated can be rotated (e.g., rotated approximately 90 degrees, rotated more than 90 degrees, rotated less than 90 degrees) counterclockwise with respect to the base component 120 along the second rotational direction 133 to interlock the power component 110 with the base component 120 (after the mount 112 has been inserted into the mount receptacle 130).

For example, once the power component 110 is connected to/interlocked with the base component 120 by rotating the power component 110 in a clockwise direction with respect to the base component 120 along the first rotational direction 131, the power component 110 can be rotated (e.g., rotated approximately 90 degrees, rotated more than 90 degrees, rotated less than 90 degrees) counterclockwise with respect to the base component 120 along the second rotational direction 133 to unlock/disconnect the power component 110 from the base component 120. In another example, once the power component 110 is connected to/interlocked with the base component 120 by rotating the power component 110 in a counterclockwise direction with respect to the base component 120 along the second rotational direction 133, the power component 110 can be rotated (e.g., rotated approximately 90 degrees, rotated more than 90 degrees, rotated less than 90 degrees) clockwise with respect to the base component 120 along the first rotational direction 131 to unlock/disconnect the power component 110 from the base component 120. Once unlocked/disconnected the mount 112 can be removed from the mount receptacle 130.

In some implementations, the power component 110 can include a set of prongs (not shown in FIG. 1) that can be connected to/plug into a receptacle included in an AC or wall outlet, effectively providing AC power to the power system 100 when the power component 110 is coupled to the base component 120. Components and circuitry included in the power system 100 can convert, for example, the received AC power to the DC power and voltage needed by a computing device that can be provided to the computing device by connecting the computing device to the power system 100 using the base receptacle 122. In these implementations, the mount 112 can include two terminals that provide the AC power to the mount receptacle 130 of the base component 120.

In some implementations, the mount 112 can include three terminals providing AC power (hot and neutral) and a separate ground to the mount receptacle 130 of the base component 120. In some implementations, the power component 110 can be a type of rotating duckhead (shown in more detail, for example, in FIG. 3) where the mount receptacle 130 of the base component 120 is configured to receive and rotatably interlock with the mount 112 of the power component 110, effectively locking the power component 110 to the base component 120. In some implementations, the mount 112 can be a keyed mount that may be inserted into the mount receptacle 130 in a specified orientation.

In some implementations, the power component 110 can include a mount receptacle (e.g., the mount receptacle 130) and the base component 120 can include a mount (e.g., the mount 112). The mount included in the base component 120 and the mount receptacle included in the power component 110 can provide a coupling mechanism for connecting any one of a variety of power components (e.g., the power component 110) to the base component 120. The mount can have a protrusion or protruding portion (e.g., tab) that can be inserted into the mount receptacle, which defines at least a portion of an opening. This will be shown in more detail with reference to FIG. 3H, for example.

Figure 2A:
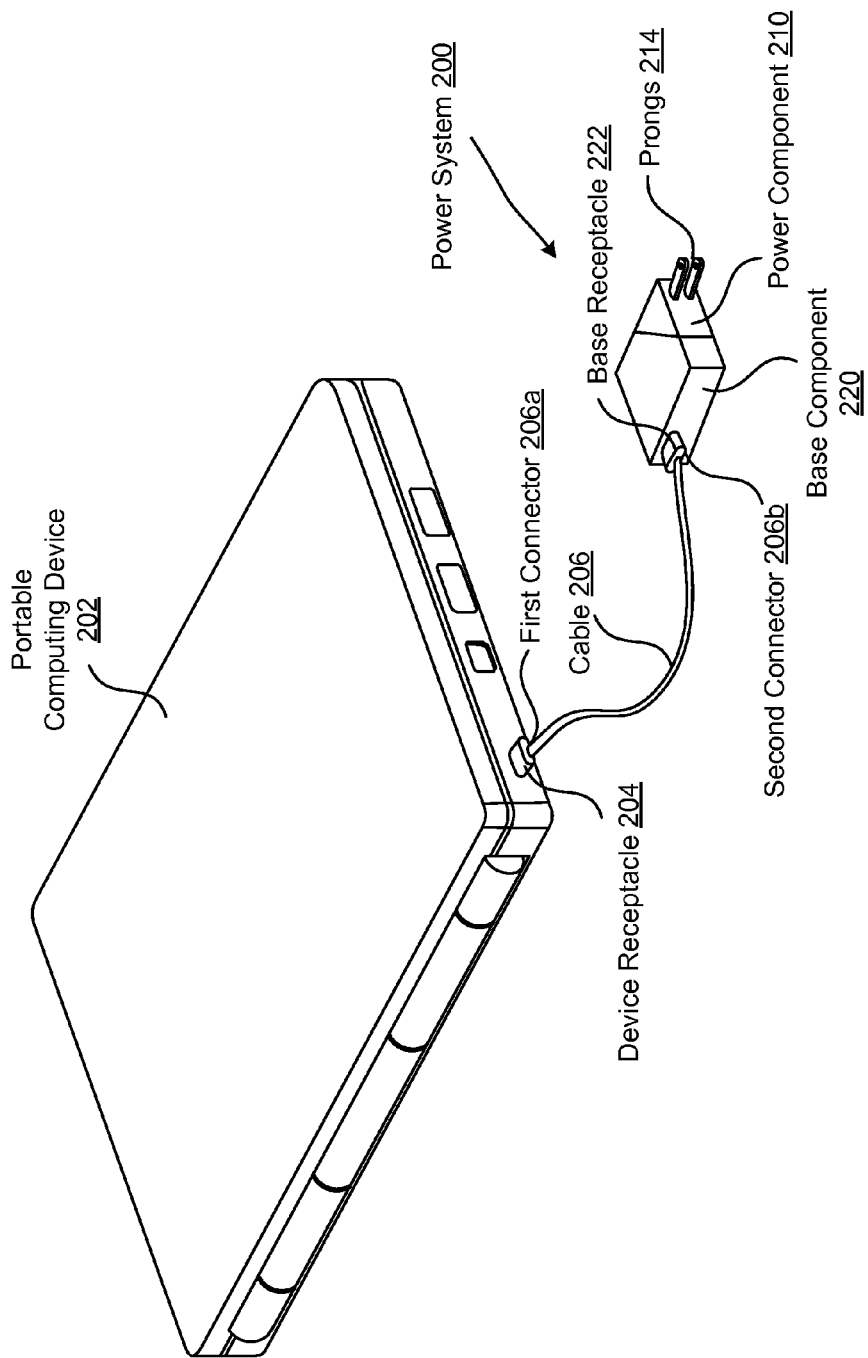
FIG. 2A is a diagram of a portable computing device that includes a device receptacle connected to an implementation of a power system.

FIG. 2A is a diagram of a portable computing device 202 that includes a device receptacle 204 connected to an implementation of a power system 200. A cable 206 can connect a power system 200 to the portable computing device 202 by connecting a first end of the cable 206 to the device receptacle 204 and a second end of the cable 206 to a base receptacle 222 included in a base component 220 of the power system 200. The cable 206 can be configured such that a first connector 206a (also can be referred to as a plug) included in the first end of the cable 206 can be operatively coupled to the device receptacle 204 and a second connector 206b (also can be referred to as a plug) included in the second end of the cable 206 can be operatively coupled to the base receptacle 222.

The power system 200 includes a power component 210 coupled to the base component 220. In the example implementation of the power system 200 shown in FIG. 2A, when the power component 210 is coupled to the base component 220, the power system 200 forms a rectangle (e.g., a rectangular profile) with the base receptacle 222 protruding from the rectangle and prongs 214 that can also protrude from the rectangle. In other implementations, when a power component is coupled to the base component, the resultant power system forms a square or triangular (e.g., a square profile or a triangular profile) with the base receptacle 222 protruding from the rectangle and prongs 214 that can also protrude from the rectangle. The prongs 214 are included in the power component 210. The prongs 214 (including the power system 200) can be plugged into a wall receptacle. The prongs 214 can provide AC power from the wall outlet to the power system 200. DC voltage can be provided to the portable computing device 202 by way of the base receptacle 222 and the connection provided by the cable 206 from the base receptacle 222 to the device receptacle 204.

In the example implementation of the power system 200 shown in FIG. 2A, the prongs 214 provide AC power to the power system 200 by connecting to respective neutral and hot slots in the AC power outlet when plugged into the AC power outlet.

Figure 2B:
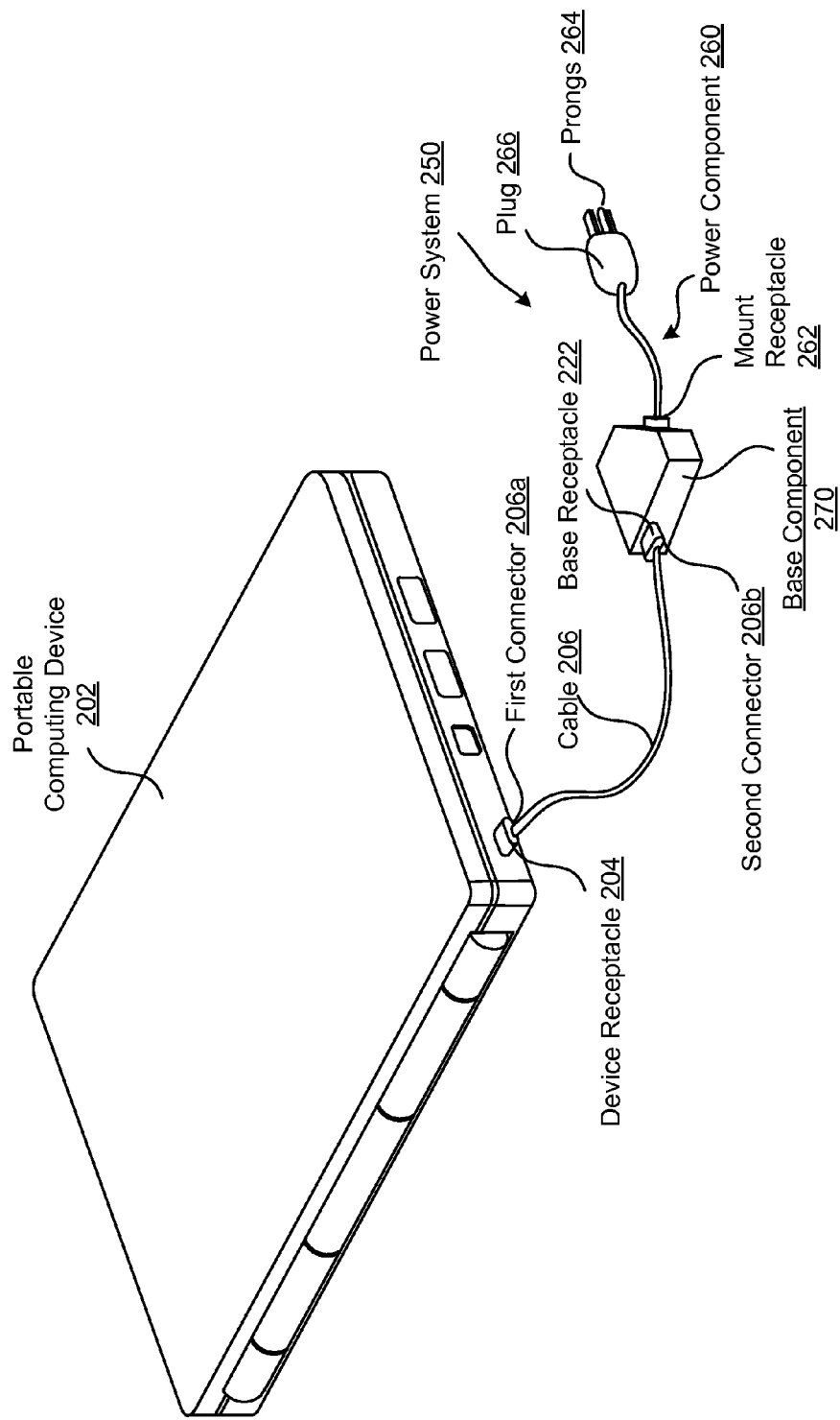
FIG. 2B is a diagram of the portable computing device that includes a device receptacle connected to an alternative implementation of a power system.

FIG. 2B is a diagram of the portable computing device 202 that includes the device receptacle 204 connected to an alternative implementation of a power system 250. The power system 250 includes a base component 270 (similar to the base component 220 in FIG. 2A) coupled to a power component 260. Similar to the power system 200 in FIG. 2A, the cable 206 can connect the power system 200 to the portable computing device 202 by connecting a first end of the cable 206 to the device receptacle 204 and a second end of the cable 206 to a base receptacle 222 included in the base component 270 of the power system 200. The cable 206 can be configured such that the first connector 206a included in the first end of the cable 206 can be operatively coupled to the device receptacle 204 and the second connector 206b included in the second end of the cable 206 can be operatively coupled to the base receptacle 222.

The power system 250 includes a power component 260 coupled to the base component 220. In the example implementations of the power system 250 shown in FIG. 2B, the power component 260 includes a mount receptacle 262 that can be coupled to the base component 220 by way of a mount include on one side of the base component 220. The mount receptacle 262 is incorporated into one end of the power component 260 and a plug 266 is incorporated into the other end of the power component 260. The plug 266 can be plugged into a wall receptacle. The plug 266 includes three prongs 264. The prongs 264 can provide AC power from the wall outlet to the power system 250. DC voltage can be provided to the portable computing device 202 by way of the base receptacle 222 and the connection provided by the cable 206 from the base receptacle 222 to the device receptacle 204.

In the example implementation of the power system 250 shown in FIG. 2B, the prongs 264 provide AC power to the power system 250 by connecting to the respective neutral, hot, and ground slots in the AC power outlet when the plug 266 is plugged into the AC power outlet.

Figure 3A:
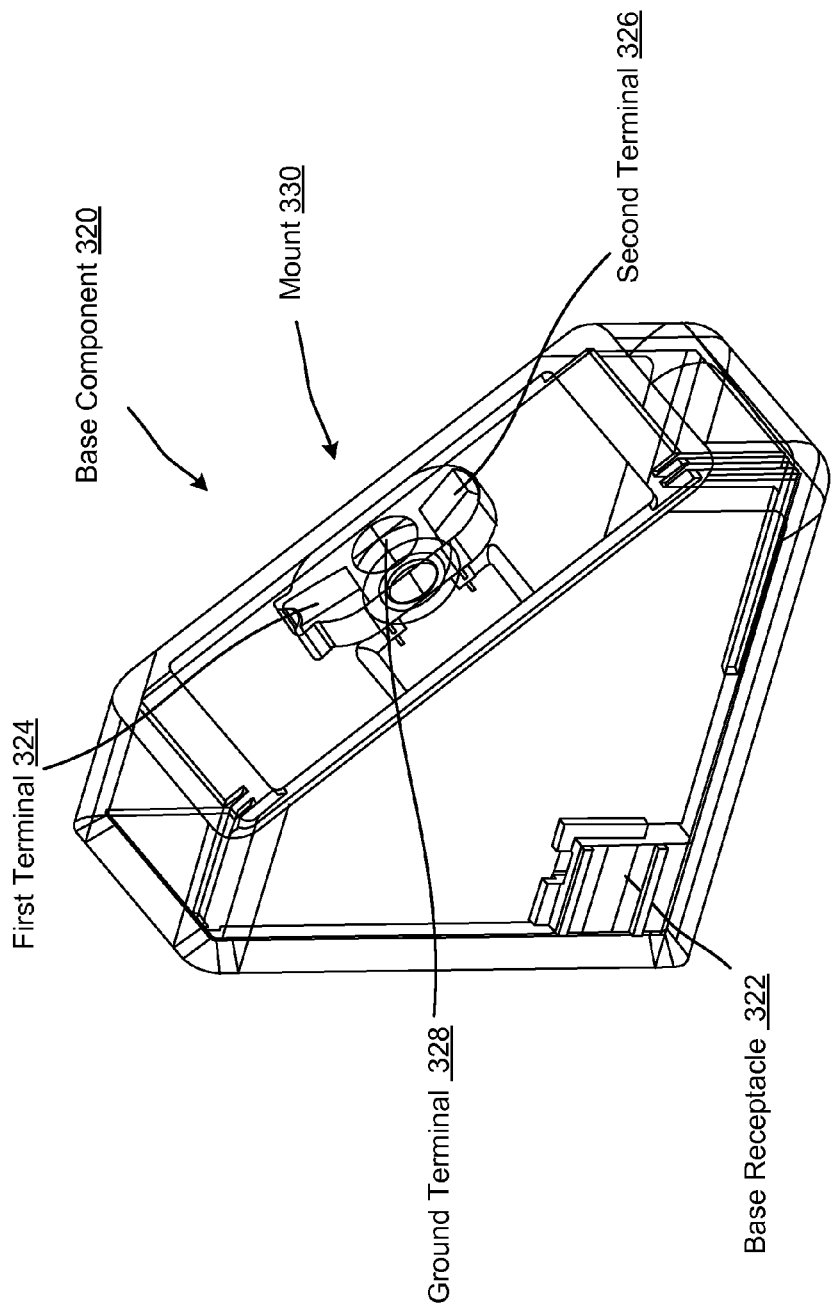
FIG. 3A is a diagram of a view of an example base component for inclusion in a power system.

FIG. 3A is a diagram of a view of an example base component 320 for inclusion in a power system (such as the power system 100 shown in FIG. 1). For example, referring to FIG. 1, the base component 320 can correspond to the base component 120 for the power system 100. In this implementation, the base component 320 includes a mount 330 (similar to the mount 112 shown in FIG. 1) that can be inserted into a mount receptacle (not shown in FIG. 3A) that can be integrated into a power component (not shown in FIG. 3A) (e.g., the power component 110). A first terminal 324 and a second terminal 326 are located on respective opposite sides/ends of the mount 330. In some implementations, the mount 330 may also include an indentation on one side/end of the mount 330 providing a type of keyed interface with the mount receptacle 312, which would include a corresponding tab that would interface with the indentation of the mount 330. This type of interface would essentially provide a "keyed" connection of the mount receptacle 312 with the mount 330. The mount receptacle 312 is inserted into the mount 330 in a particular orientation with respect to the mount 330 determined by the location of the protrusion on the mount receptacle 312 and the indentation of the mount 330. In some implementations, the keyed connection is provided by an extrusion included in the mount 330 and a corresponding tab included in the mount receptacle 312.

Also included in the mount 330 is a ground terminal 328 that is located in a center of the mount 330. As shown in FIG. 3A, the base component 320 can be of a triangular shape.

The base component 320 includes a base receptacle 322. As described with reference to FIGS. 2A-B, a cable can include a first end connected to a device receptacle included in a computing device and a second end connected to the base receptacle 322 included in the base component 320. The cable can be configured such that a first connector 206a included in the first end of the cable 206 can be operatively coupled to the device receptacle 204 and a second connector 206b included in the second end of the cable 206 can be operatively coupled to the base receptacle 222. For example, the cable 206, the base receptacle 222, and the device receptacle can be configured to provide and accept USB Type-C connections and interfaces.

Figure 3B:
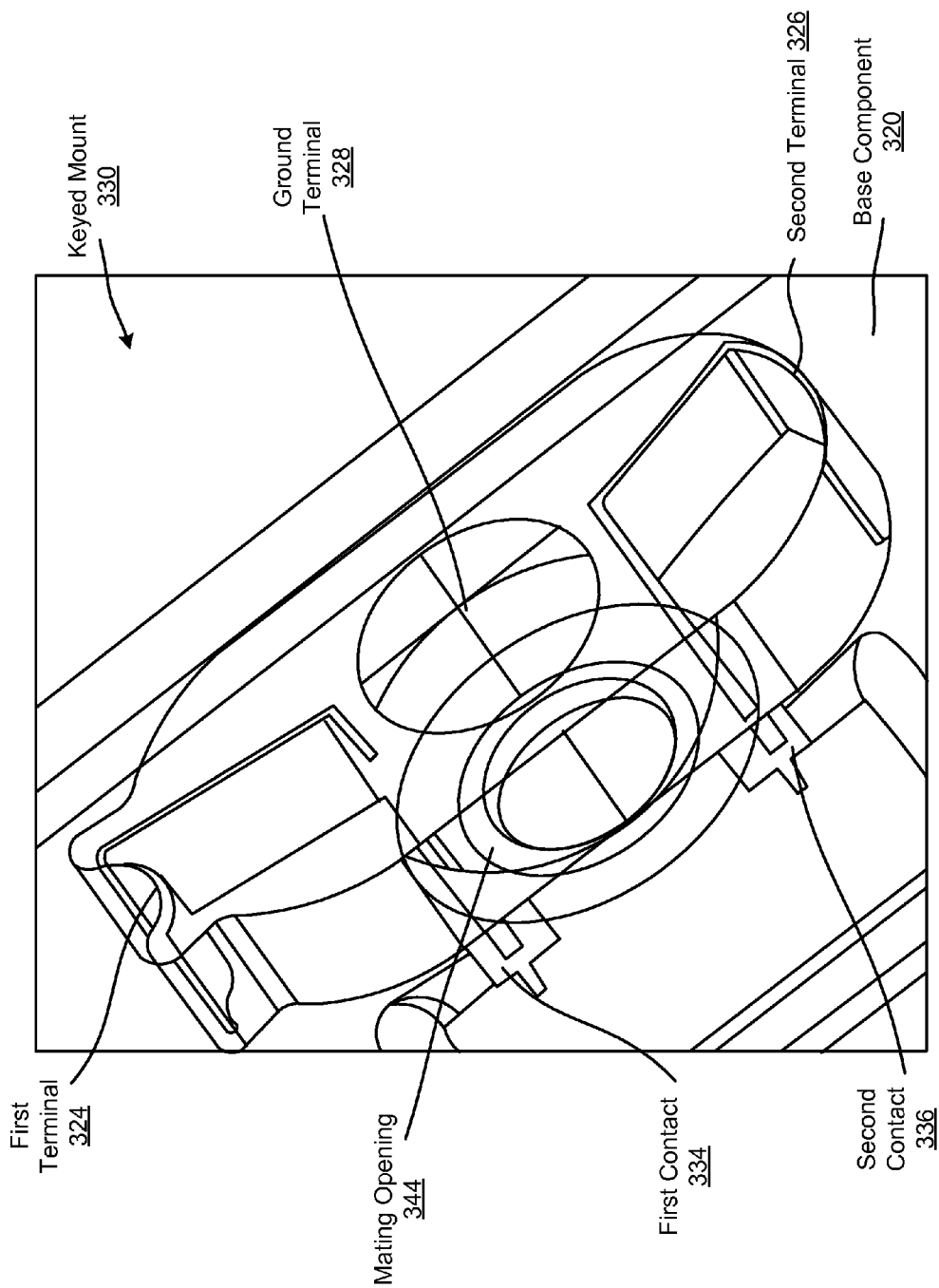
FIG. 3B is a diagram of a magnified view of an example mount.

FIG. 3B is a diagram of a magnified view of the example mount 330 included in the base component 320 shown in FIG. 3A. A first contact 334 and a second contact 336 are included on a backside of/underneath the mount 330 and inside of the base component 320. In some implementations, the base component 320 (including the mount 330) can be made of material such as a plastic or another insulating material. The first contact 334 and the second contact 336 can be wired contacts whose respective wires are insert molded through the plastic housing of the base component 320 (and specifically through/into the mount 330). The insert molded wires of the first contact 334 and the second contact 336 can be disposed such that each respective wire is disposed along the inside of/along the edge of the first terminal 324 and the second terminal 326, respectively. As shown in FIG. 3B, the mount 330 includes a mating opening 344.

Figure 3C:
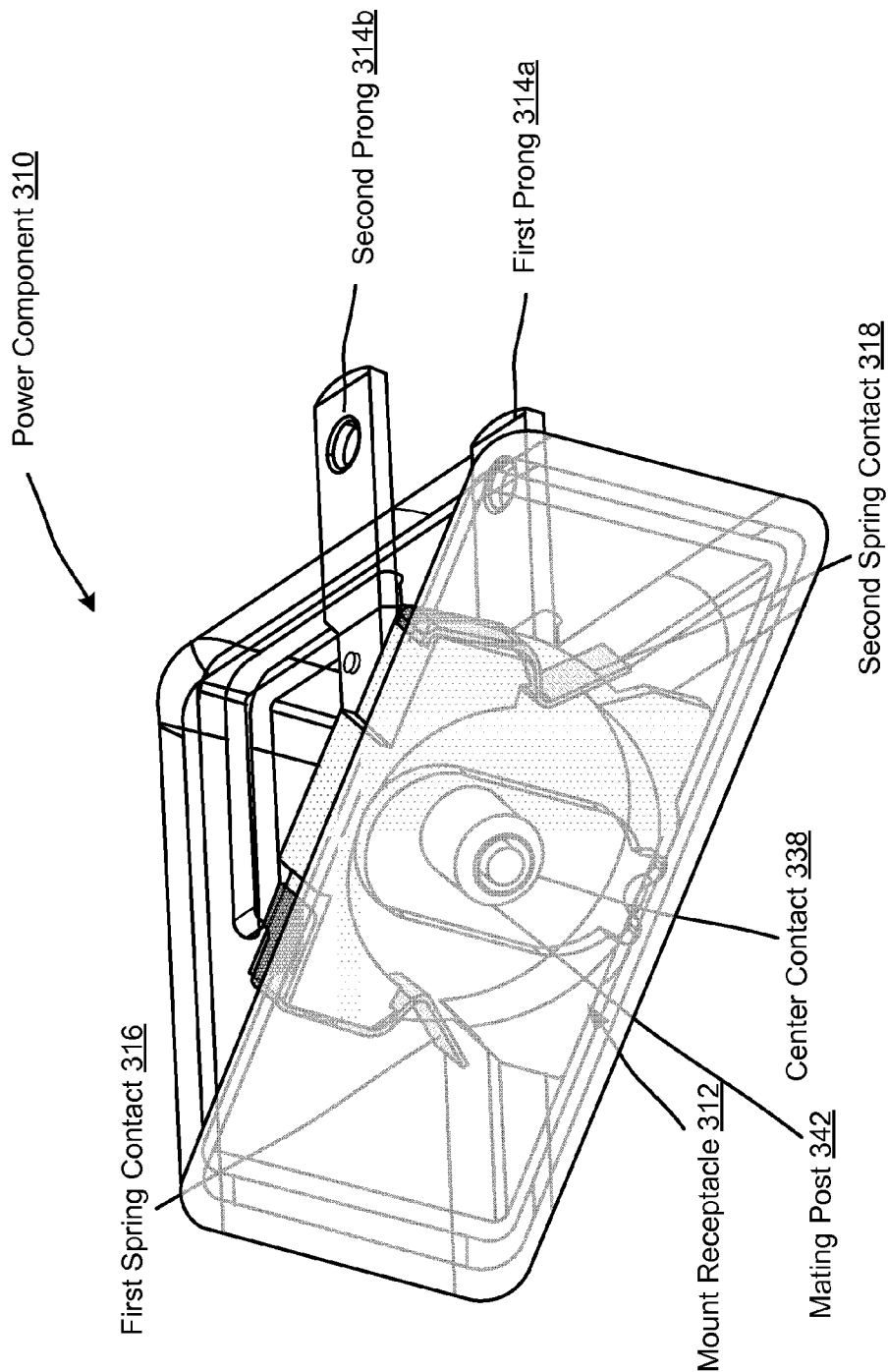
FIG. 3C is a diagram of a view of an example power component for inclusion in a power system.

FIG. 3C is a diagram of a view of an example power component 310 for inclusion in a power system. For example, referring to FIG. 1, the power component 310 can correspond with the power component 110 for the power system 100. The power component 310 includes a mount receptacle 312 that can be coupled to the mount 330 included in the base component 320 as shown in FIGS. 3A-B. The power component 310 includes prongs 314a-b. The power component 310 includes a first spring contact 316 and a second spring contact 318. As shown in FIG. 3E, the first spring contact 316 is connected to the first prong 314a and the second spring contact 318 is connected to the second prong 314b.

As shown in FIG. 3C, a mating post 342 can be a protrusion disposed within the mount receptacle 312 that is configured to be inserted into the mating opening 344 included in the mount 330 when the power component 310 is initially placed on the base component 320. The mating opening 344 can function as a guide that receives the mating post 342 of the mount 330.

As shown in FIG. 3C, the power component 310 can be of a triangular shape or can define a triangular profile. The prongs 314a-b are included on a side of the power component 310 that is non-parallel to the side of the power component that includes the mount receptacle 312.

The power component 310 includes a center contact 338 placed in a lumen defined within the mating post 342. Referring to FIG. 2B, in cases where the power component includes a three-pronged plug (e.g., the power component 260 including the plug 266), the center contact 338 will engage with the ground terminal 328, shown in FIG. 3A, providing a dedicated ground connection to the base component 320. Referring to FIG. 3B, the mating opening 344 can be placed over the mating post 342 when attaching/interfacing/connecting the power component 310 to the base component 320.

Figure 3D:
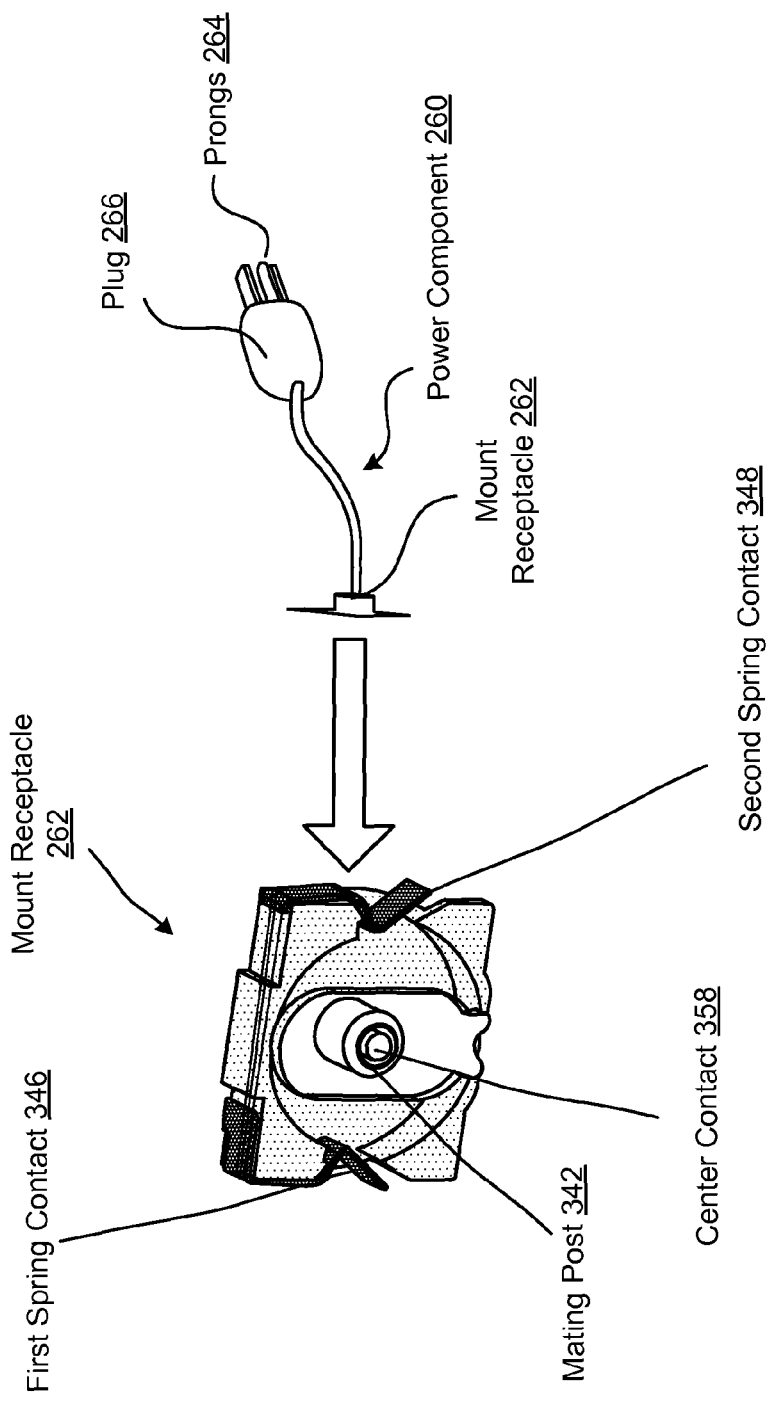
FIG. 3D is a diagram of a magnified view of a mount receptacle included in a power component that also includes a three-pronged plug.
Figure 3E:
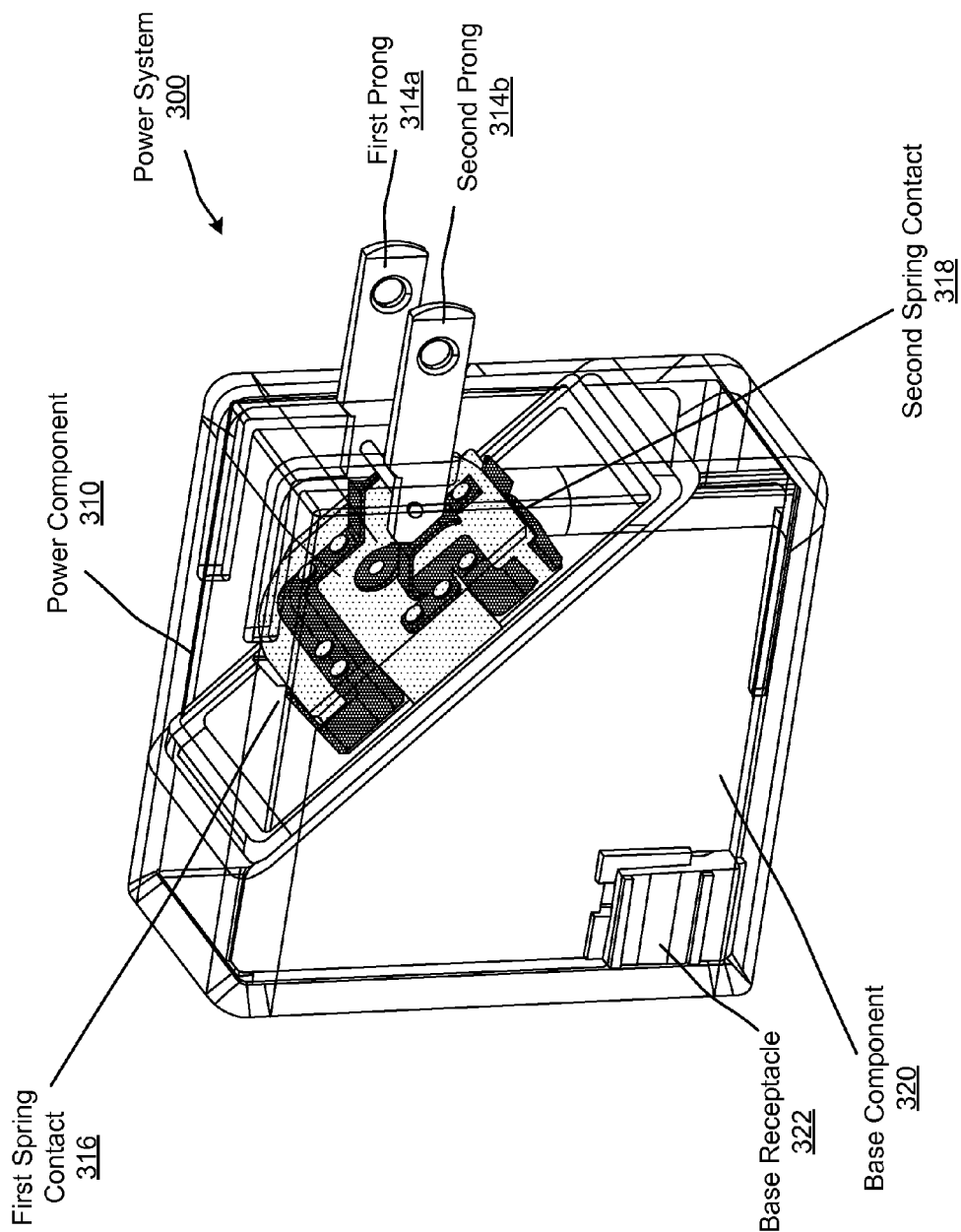
FIG. 3E is a diagram of a view of an assembled power system including a base component connected to a power component where the power component is in a first orientation.

FIG. 3D is a diagram of a magnified view of the power component 260 shown in FIG. 2B including a mount receptacle 262. The mount receptacle 262 of the power component 260 includes the three-pronged plug 266. For example, the mount receptacle 262 includes components included in the mount receptacle 312 of the power component 310 shown in for example FIG. 3C. The mount receptacle 262 includes a first spring contact 346, a second spring contact 348, and a center contact 358. In one example, the mount receptacle 262 can be coupled to the base component 320 using the mount 330 where the mount receptacle 262 and the mount 330 collectively define the coupling mechanism for connection of the power component 260 to the base component 220.

For example, the mount receptacle 262 can include a hot contact provided from a first prong included in the three-pronged plug 266 to the first spring contact 346. The mount receptacle 262 can include a neutral contact provided from a second prong included in the three-pronged plug 266 to the second spring contact 348. The mount receptacle 262 can include a ground contact provided from a dedicated ground prong included in the three-pronged plug 266 to the center contact 358. The mount receptacle 262 can be keyed or can define a keyed opening such that it can be inserted to the mount 330, which can also be keyed, and rotated (e.g., rotated approximately 90 degrees) to interlock (e.g., coupled, locked) the mount receptacle 262 to the base component 220. Once interlocked, the contacts included on the mount receptacle 262 will contact/connect to the respective terminals on the base component 320, shown in FIG. 3A for example, providing the AC power from the prongs 264 of the plug 266, when the plug 266 is connected to/plugged into an AC outlet, to the circuitry included in the base component 320. For example, referring to FIGS. 3A-B, the first spring contact 346 of the mount receptacle 262 can contact/connect to the first terminal 324. A second spring contact 348 of the mount receptacle 262 can contact/connect to the second terminal 326. The center contact 358 of the mount receptacle 262 can contact/connect to the ground terminal 328.

When the power component 310 shown in FIG. 3C is inserted into the base component 320 shown in FIG. 3A, and specifically, when the mount receptacle 312 receives the mount 330, the mount receptacle 312 and the mount 330 provide a coupling mechanism for operatively coupling the power component 310 to the base component 320. For example, when the mount receptacle 312 receives the mount 330, the power component 310 can be rotated (e.g., rotated approximately 90 degrees) with respect to the base component 320 to interlock with the base component 320. In this case, the prongs 314a-b will face in an outward or forward direction as shown in FIG. 2A (e.g., prongs 214) and as shown in FIG. 3E.

FIG. 3E is a diagram of a view of an assembled power system 300 including the base component 320 connected to the power component 310 where the power component 310 is in a first orientation. When the power component 310 is rotated clockwise with respect to the base component 320, once placed in the interlock position, the power component 310 is assembled with the base component 320 so that the prongs 314a-b are orientated in a forward or outward direction from the assembled power system 300.

FIG. 3E also shows additional details of the power component 310. For example, FIG. 3E shows the contacts and connections from the first prong 314a to the first spring contact 316. FIG. 3E shows the contacts and connections from the second prong 314b to the second spring contact 318.

Though not shown in FIG. 3E, the base component 320 includes two stops that prevent over-rotation of the power component 310 when it is rotated with respect to the base component 320 when connecting/coupling the power component 310 to the base component 320.

Figure 3F:
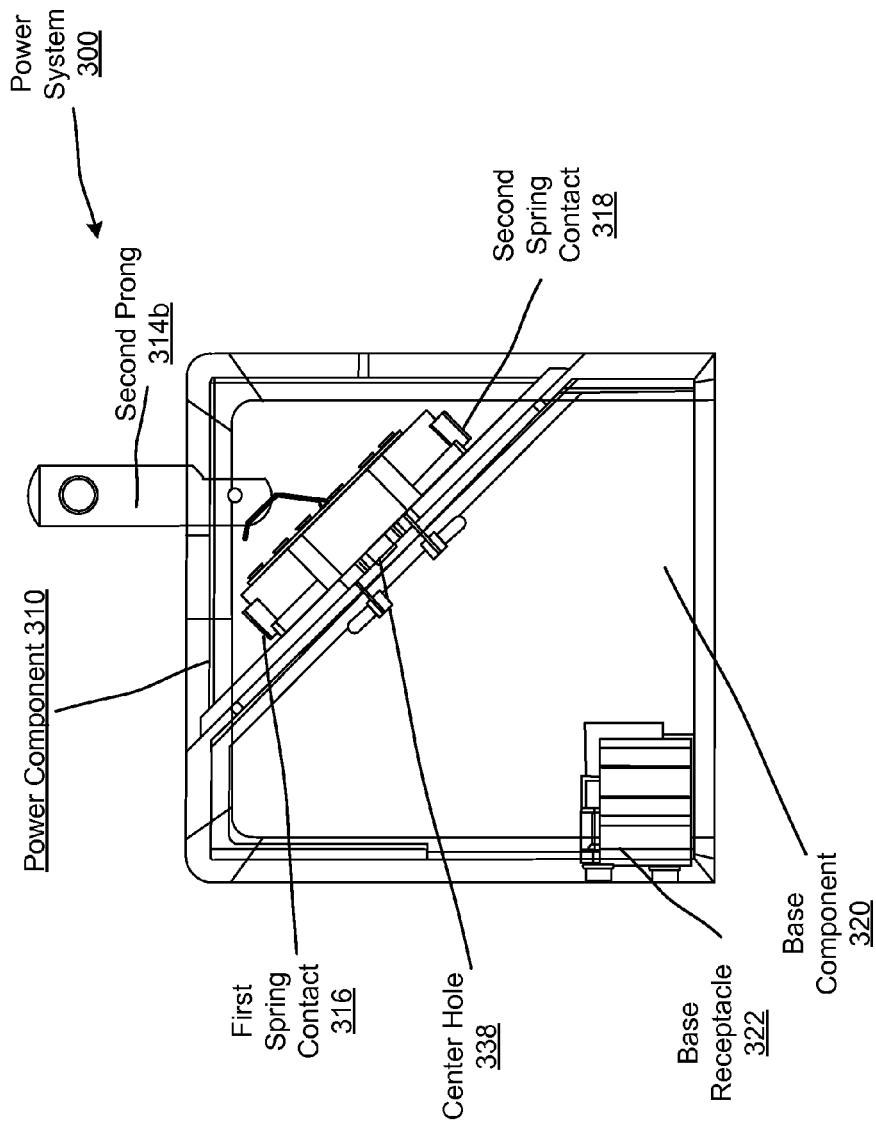
FIG. 3F is a diagram of a view of an assembled power system including a base component connected to a power component where the power component is in a second orientation.

FIG. 3F is a diagram of a view of an assembled power system 300 including the base component 320 connected to the power component 310 where the power component 310 is in a second orientation. When the power component 310 is rotated counterclockwise with respect to the base component 320, once placed in the interlock position, the power component 310 is assembled with the base component 320 so that the prongs 314a-b are orientated in a upward direction from the assembled power system 300.

When the power component 310 is coupled to the base component 320, and specifically, when the mount receptacle 312 receives the mount 330, the mount receptacle 312 and the mount 330 provide a coupling mechanism for operatively coupling the power component 310 to the base component 320. For example, when the mount 330 is inserted into the mount receptacle 312, the power component 310 can be rotated approximately 90 degrees counterclockwise with respect to the base component 320 in order to interlock with the base component 320. In this case, the prongs 314a-b face in an upward direction as shown in FIG. 3F. (In FIG. 3F, the first prong 314a is located behind the second prong 314b and, as such, is not viewable in the figure.)

Figure 3G:
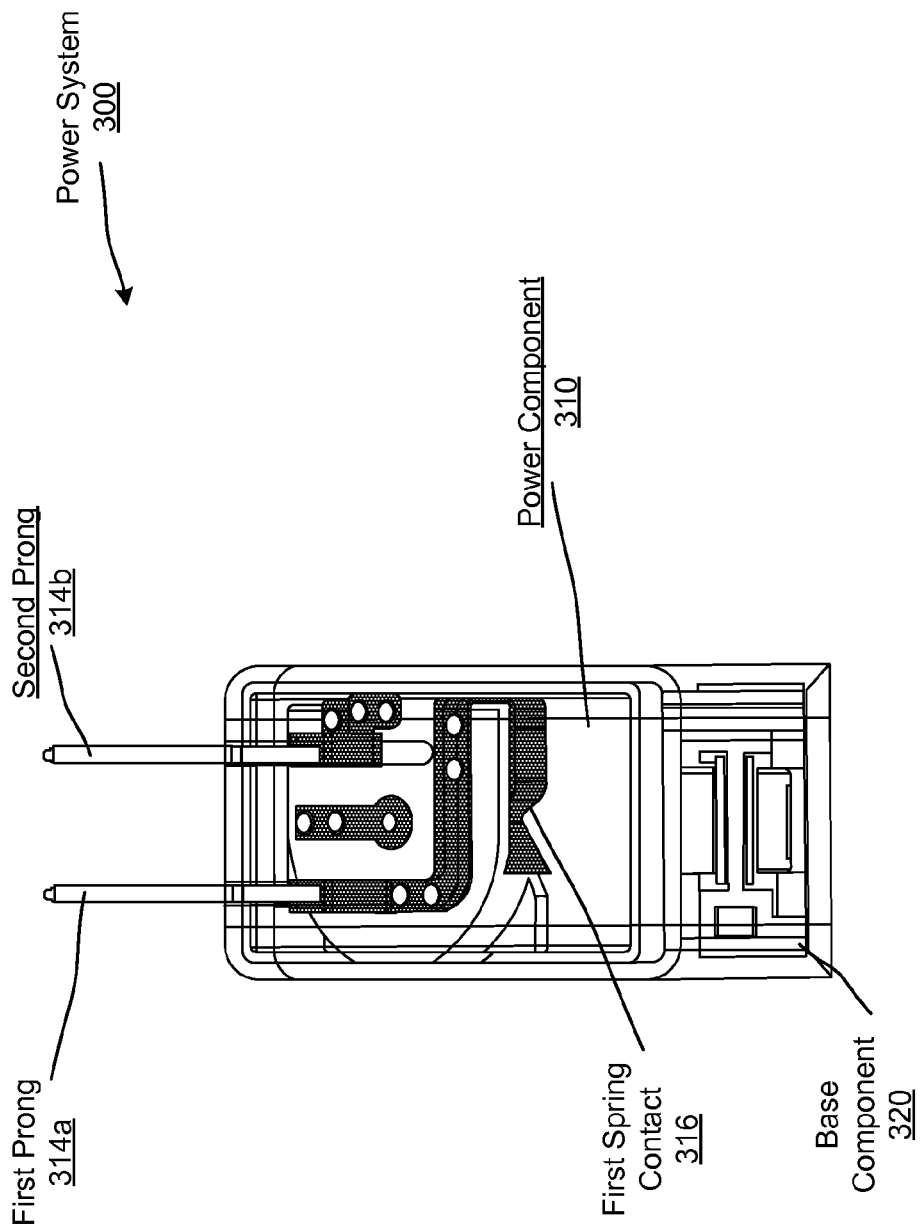
FIG. 3G is a diagram of a side view of an assembled power system including a base component connected to a power component where the power component is in a second orientation.

FIG. 3G is a diagram of a side view of an assembled power system 300 including the base component 320 connected to the power component 310 where the power component 310 is in the second orientation as shown in FIG. 3F. For example, FIG. 3G shows the contacts and connections from the first prong 214a to the first spring contact 316.

Figure 3H:
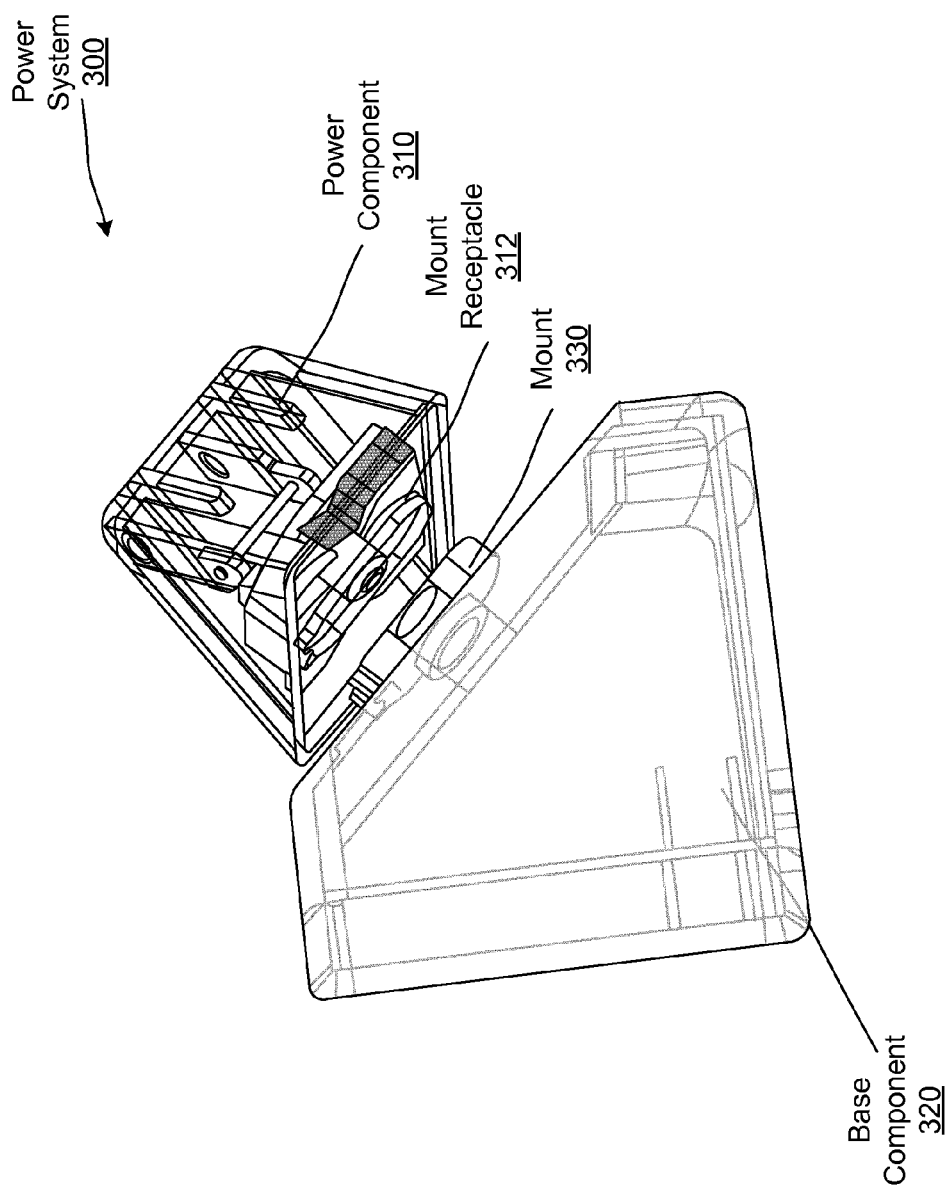
FIG. 3H is a diagram of a view of a power system showing an mount receptacle of a power component placed above a mount of a base component prior to connecting/coupling the mount receptacle to the mount.

FIG. 3H is a diagram of a view of the power system 300 showing the mount receptacle 312 of the power component 310 placed above the mount 330 of the base component 320 prior to connecting/coupling the mount receptacle 312 to the mount 330. As shown in FIG. 3G, the power component 310 is disposed at (aligned at) approximately a 90 degree angle with respect to the base component 320. The mount receptacle 312 is rotatably coupled to the mount 330. In this position, the power component 310 can be rotated 90 degrees either clockwise or counterclockwise dependent on the desired orientation of the prongs as shown and described above.

Figure 3I:
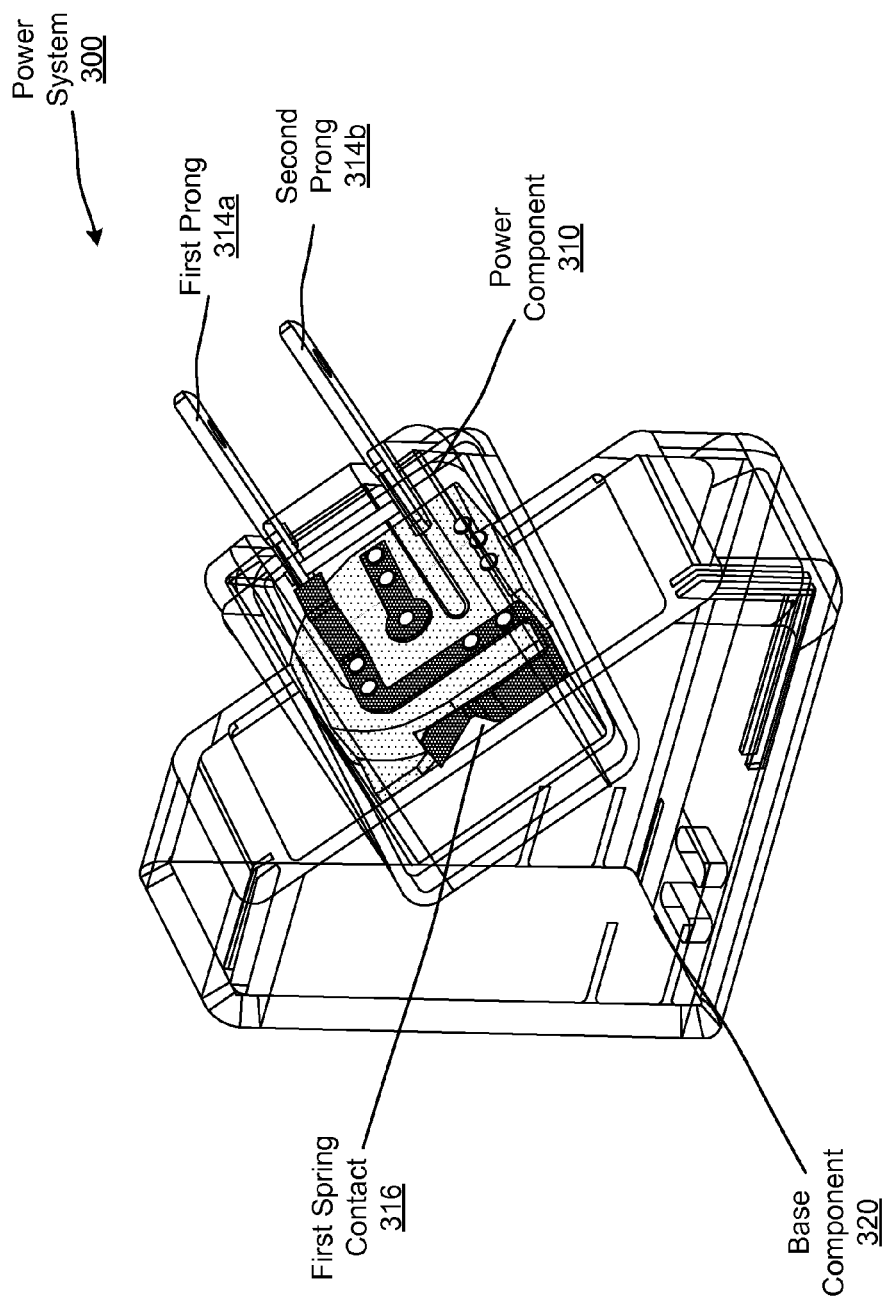
FIG. 3I is a diagram of a top view of a power system showing an mount receptacle of a power component placed within/initially connected to a mount of a base component 320.

FIG. 3I is a diagram of a top view of the power system 300 showing the mount receptacle 312 of the power component 310 initially connected to the mount 330 of the base component 320. The power component 310 is disposed at (aligned at) approximately a 90 degree angle with respect to the base component 320. The mount receptacle 312 can now be rotatably coupled to the mount 330. In this position, the power component 310 can be rotated 90 degrees either clockwise or counterclockwise dependent on the desired orientation of the prongs 314a-b as shown and described above. FIG. 3H also shows the connection from the first prong 314a to the first spring contact 316.

Figure 3J:
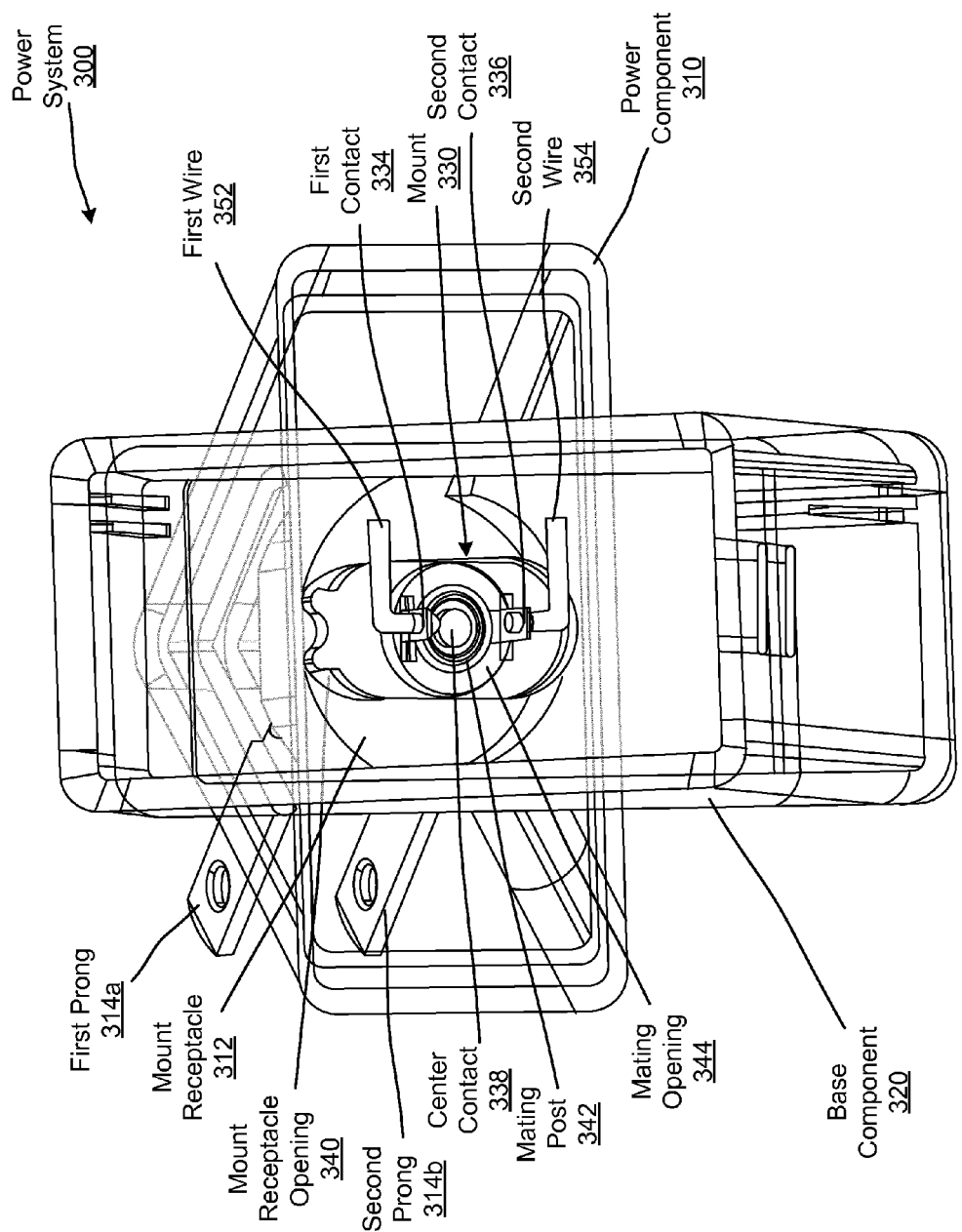
FIG. 3J is a diagram of a bottom view of a power system showing an mount receptacle of a power component placed within/initially connected to a mount of a base component.

FIG. 3J is a diagram of a bottom view of the power system 300 showing the mount receptacle 312 of the power component 310 initially connected to the mount 330 of the base component 320. The bottom view is a view of the inside of the mount receptacle 312 as seen from the base component 320 and, in particular, as seen from the perspective of the mount 330.

Figure 3K:
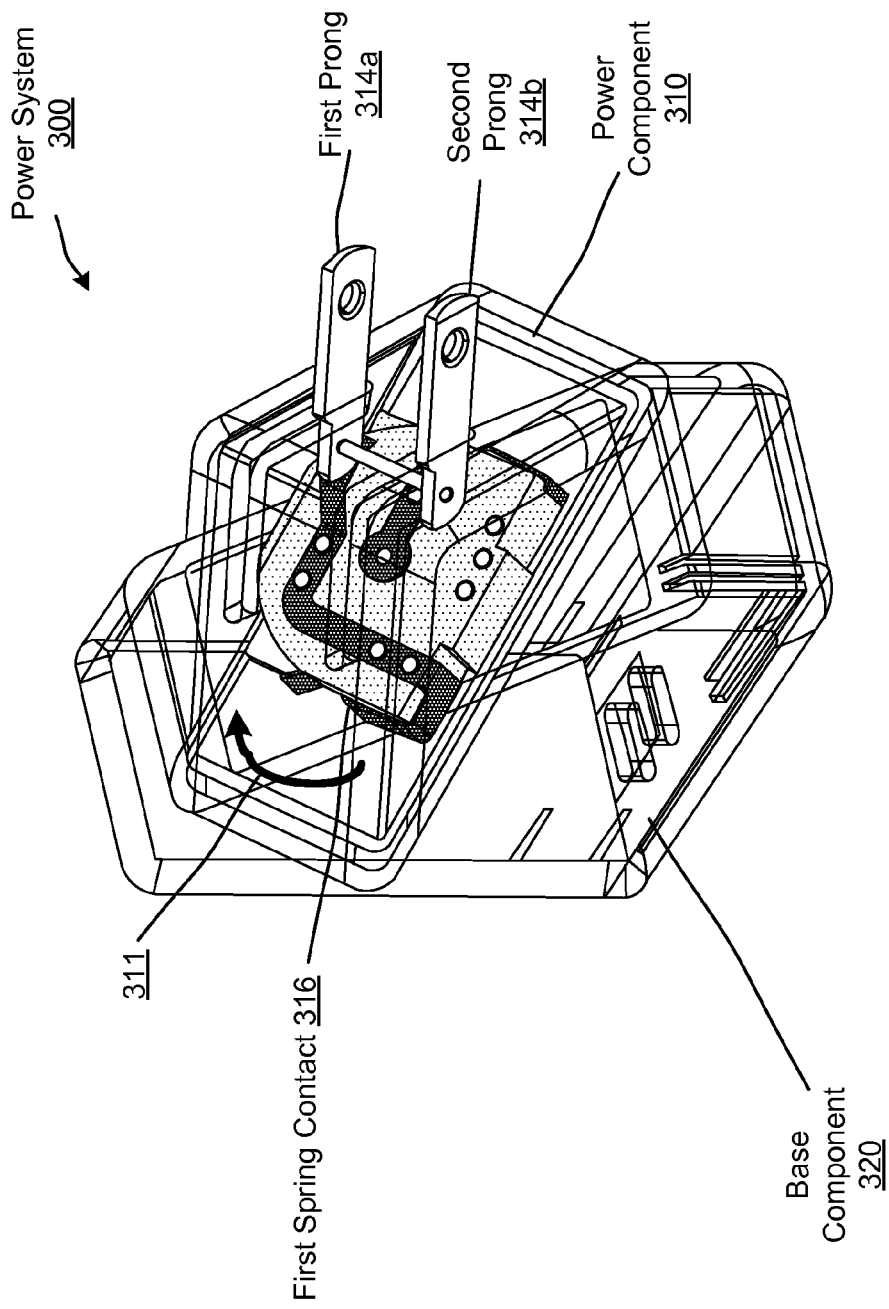
FIG. 3K is a diagram of a top view of a power system showing an mount receptacle of a power component connected/coupled to a mount of a base component and rotated approximately forty-five degrees in a clockwise direction.

FIG. 3K is a diagram of a top view of the power system 300 showing the mount receptacle 312 of the power component 310 connected/coupled to the mount 330 of the base component 320 and rotated approximately 45 degrees in a clockwise direction (arrow 311).

Figure 3L:
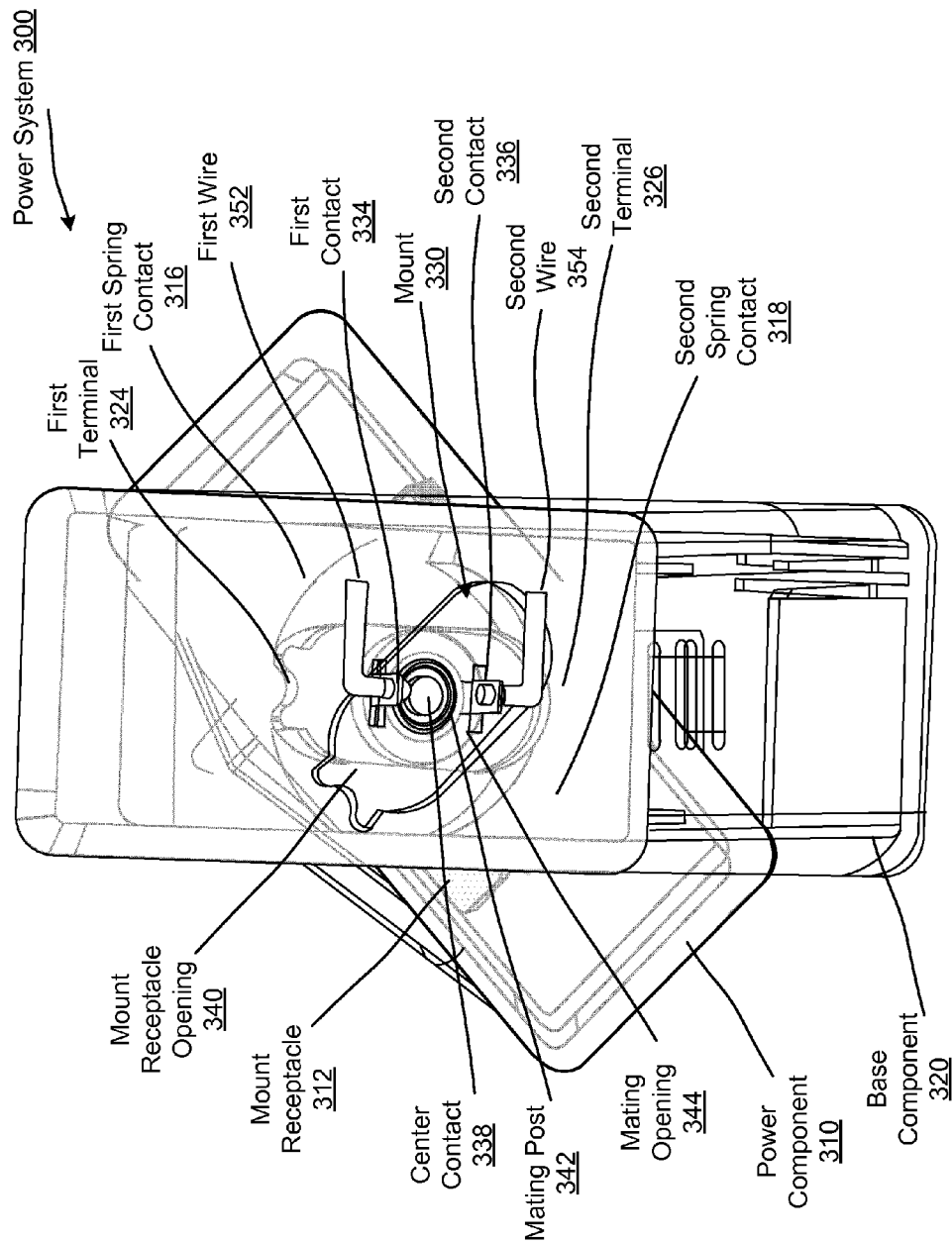
FIG. 3L is a diagram of a bottom view of a power system showing a mount receptacle of the power component connected/coupled to a mount of a base component and rotated approximately forty-five degrees in a clockwise direction.

FIG. 3L is a diagram of a bottom view of the power system 300 showing the mount receptacle 312 of the power component 310 connected/coupled to the mount 330 of the base component 320 and rotated approximately 45 degrees in a clockwise direction. The bottom view is a view of the inside of the mount receptacle 312 as seen from the base component 320 and, in particular, as seen from the perspective of the mount 330.

Figure 3M:
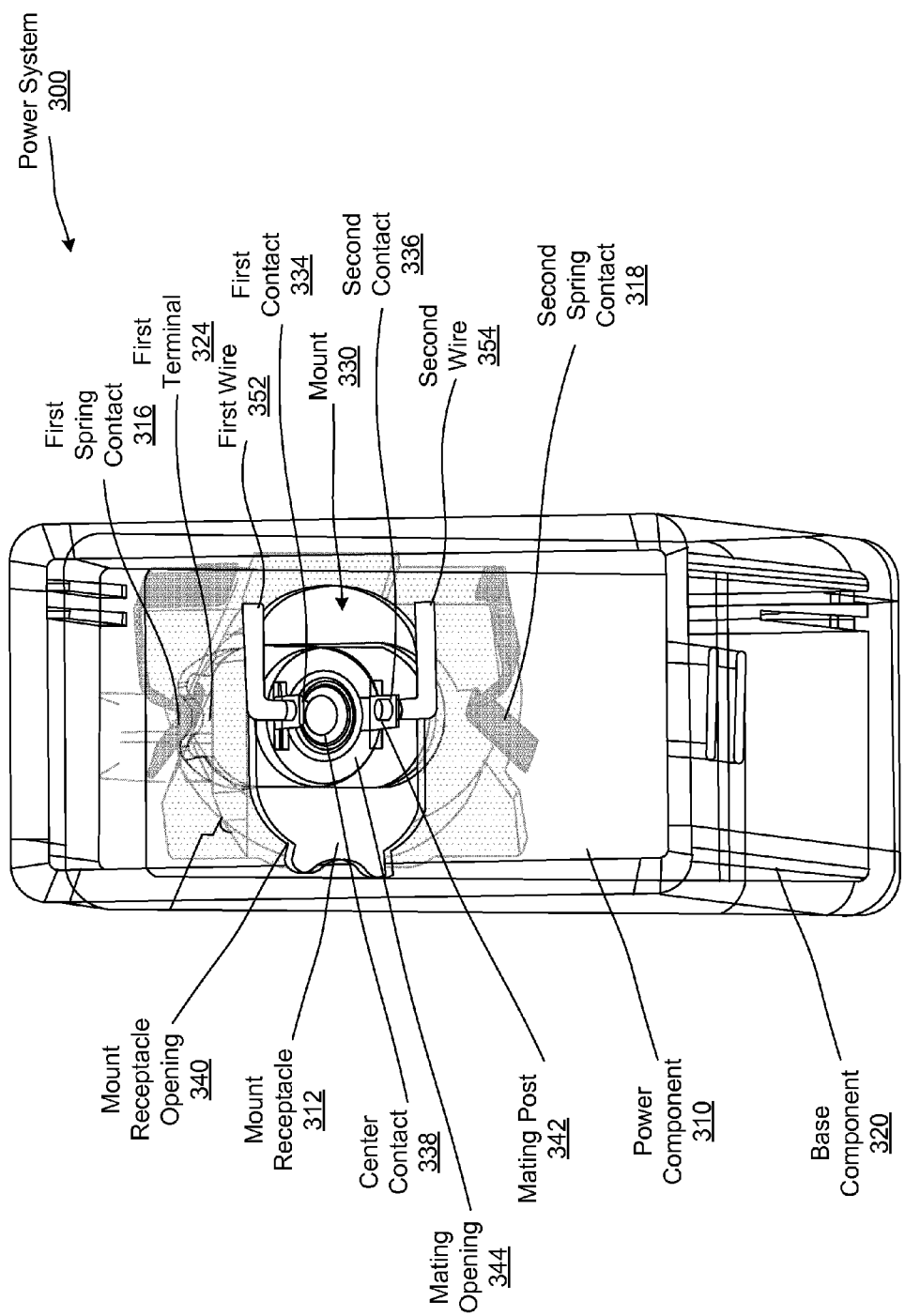
FIG. 3M is a diagram of a bottom view of a power system showing a mount receptacle of the power component connected/coupled to a mount of a base component and rotated approximately ninety degrees in a clockwise direction.

FIG. 3M is a diagram of a bottom view of the power system 300 showing the mount receptacle 312 of the power component 310 connected/coupled to the mount 330 of the base component 320 and rotated approximately 90 degrees in a clockwise direction. The bottom view is a view of the inside of the mount receptacle 312 as seen from the base component 320 and, in particular, as seen from the perspective of the mount 330. In this configuration, the power component 310 is completely coupled to/connected to the base component 320 forming the completed power system 300.

Referring to FIGS. 3J, 3K, and 3L, the power component 310 is placed at approximately a 90 degree angle with respect to the base component 320 as shown in FIG. 3J. Amount receptacle opening 340 is shaped to interface with the mount 330 when the power component 310 is placed on the base component 320 at an approximate 90 degree angle with respect to the base component 320. Alternatively stated, the mount 330 is shaped to accept the power component 310 when the power component 310 is placed on the base component 320 at an approximate 90 degree angle with respect to the base component 320. The mount receptacle 312 includes the mating post 342 that can be inserted into the mating opening 344 when attaching/interfacing/connecting the power component 310 to the base component 320.

Interfacing/connecting the power component 310 to the base component 320 (the power component 310 is placed on the mount 330 accordingly), allows the mount receptacle 312 to be rotatably coupled to the mount 330. The mount receptacle 312 and the mount 330 define the coupling mechanism for connection of the power component 310 to the base component 320. In the position shown in FIG. 3J, the power component 310 can be rotated approximately 90 degrees in either a clockwise direction or a counterclockwise direction with respect to the base component 320. Referring to FIGS. 3E and 3F, the choice of the rotational direction for the power component 310 determines the location/placement of the prongs 314a-b included in the power component 310 with respect to the base receptacle 322 included in the base component 320.

Referring to FIGS. 3B, 3J, 3L, and 3M, the first contact 334 and the second contact 336 can be wired contacts whose respective wires are insert molded through the plastic housing of the base component 320 (and specifically molded through/into the mount 330). As shown in FIG. 3B, the insert molded wires of the first contact 334 and the second contact 336 can be placed such that each respective wire runs along the inside of/along the edge of the first terminal 324 and the second terminal 326, respectively.

The first contact 334 is coupled to a first wire 352 that will terminate in a connection to a printed circuit board (PCB) included in the base component 320. Similarly, the second contact 336 is coupled to a second wire 354 that will terminate in a connection to a printed circuit board (PCB) included in the base component 320.

For example, referring to FIGS. 3J, 3L, and 3M, once the power component 310 is fully coupled to/connected to the base component 320 forming the completed power system 300 (as shown in FIG. 3M), the prongs 314a-b can provide AC power from the power component 310 to the base component 320 when the power system 300 is plugged into a wall outlet that provides AC power. The first prong 314a can be plugged into the hot slot of the wall outlet and the second prong 314b can be plugged into the neutral slot of the wall outlet. The first spring contact 316 is connected to the first prong 314a and the second spring contact 318 is connected to the second prong 314b.

Rotating and connecting the power component 310 to the base component 320 results in the first spring contact 316 included in the power component 310 being rotated into/ connecting to the first terminal 324 included in the base component 320. This results in the hot portion of the AC power being available on the first contact 334. The first wire 352 runs the hot portion of the AC power to the PCB included in the base component. Similarly, rotating and connecting the power component 310 to the base component results in the second spring contact 318 included in the power component 310 being rotated into/connecting to the second terminal 326 included in the base component 320. This results in the neutral portion of the AC power being available on the second contact 336. The second wire 354 runs the hot portion of the AC power to the PCB included in the base component.

In some implementations, the power component 310 may provide a dedicated or separate ground by way of the center contact 338. As described with reference to FIGS. 2B and 3D, the power component 310 may include a three-pronged plug (e.g., power component 260 and three-pronged plug 266) where a third prong included in the plug provides the dedicated ground. The power component 310 (and specifically the mount receptacle 312) can provide/connect the dedicated ground to a center contact 338. Rotating and connecting the power component 310 to the base component 320 results in center contact 338 of the mount receptacle 312 making contact with/connecting to the ground terminal 328 included in the base component 320.

Figure 4:
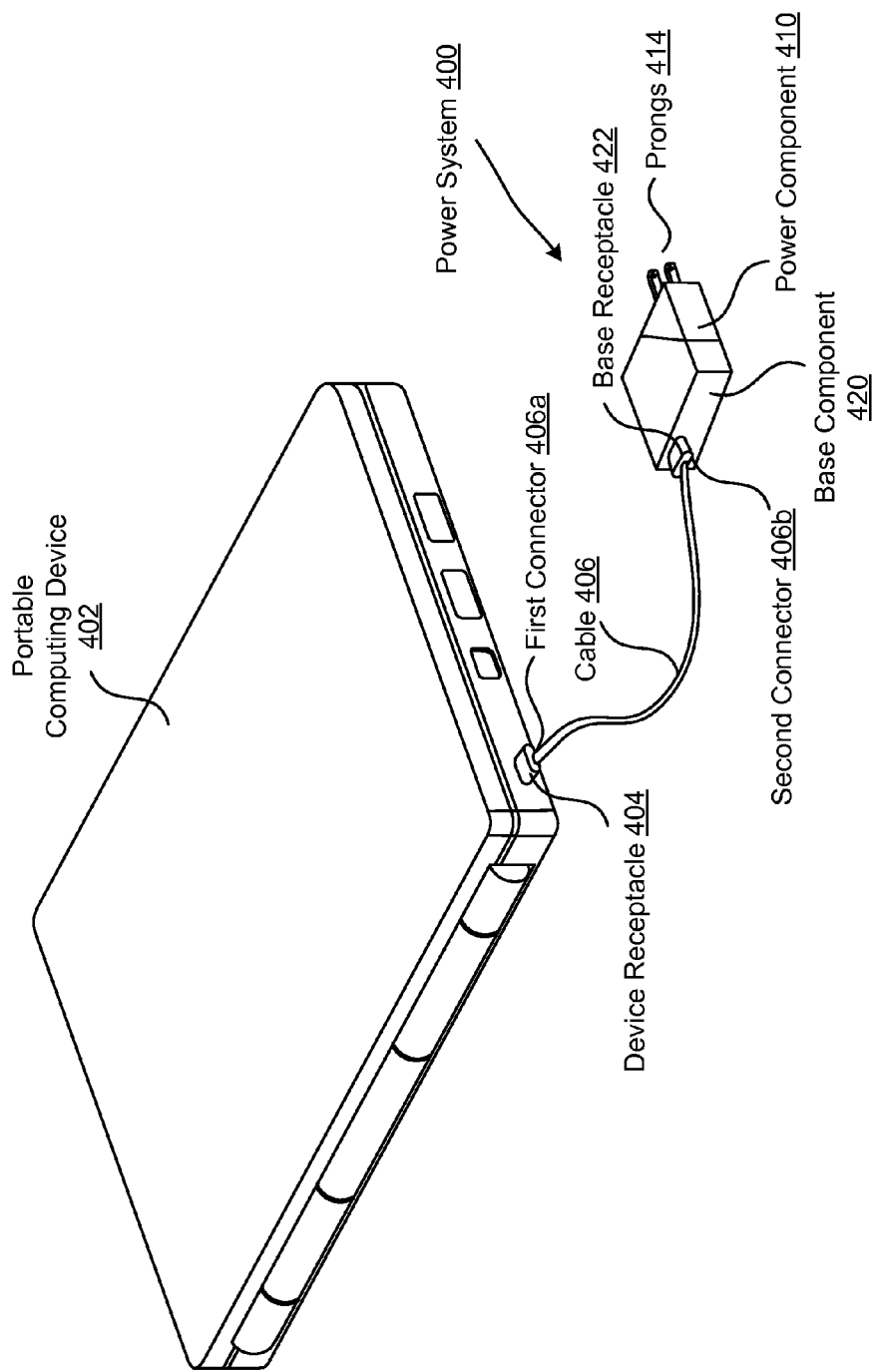
FIG. 4 is a diagram of a portable computing device that includes a device receptacle connected to an implementation of a power system where a power component is in an orientation with respect to a base component as shown in FIG. 3F.

FIG. 4 is a diagram of a portable computing device 402 that includes a device receptacle 404 connected to an implementation of a power system 400 where a power component 410 is in an orientation with respect to a base component 420 as shown in FIG. 3F. A cable 406 can connect a power system 400 to the portable computing device 402 by connecting a first end of the cable 406 to the device receptacle 404 and a second end of the cable 406 to a base receptacle 422 included in a base component 420 of the power system 400. The cable 406 can be configured such that a first connector 406a included in the first end of the cable 406 can be operatively coupled to the device receptacle 404 and a second connector 406b included in the second end of the cable 406 can be operatively coupled to the base receptacle 422. Prongs 414 can be oriented in an upward direction as compared to the direction of the orientation of the prongs 214 (e.g., oriented in a forward direction) as shown in FIG. 2A.

Figure 5A:
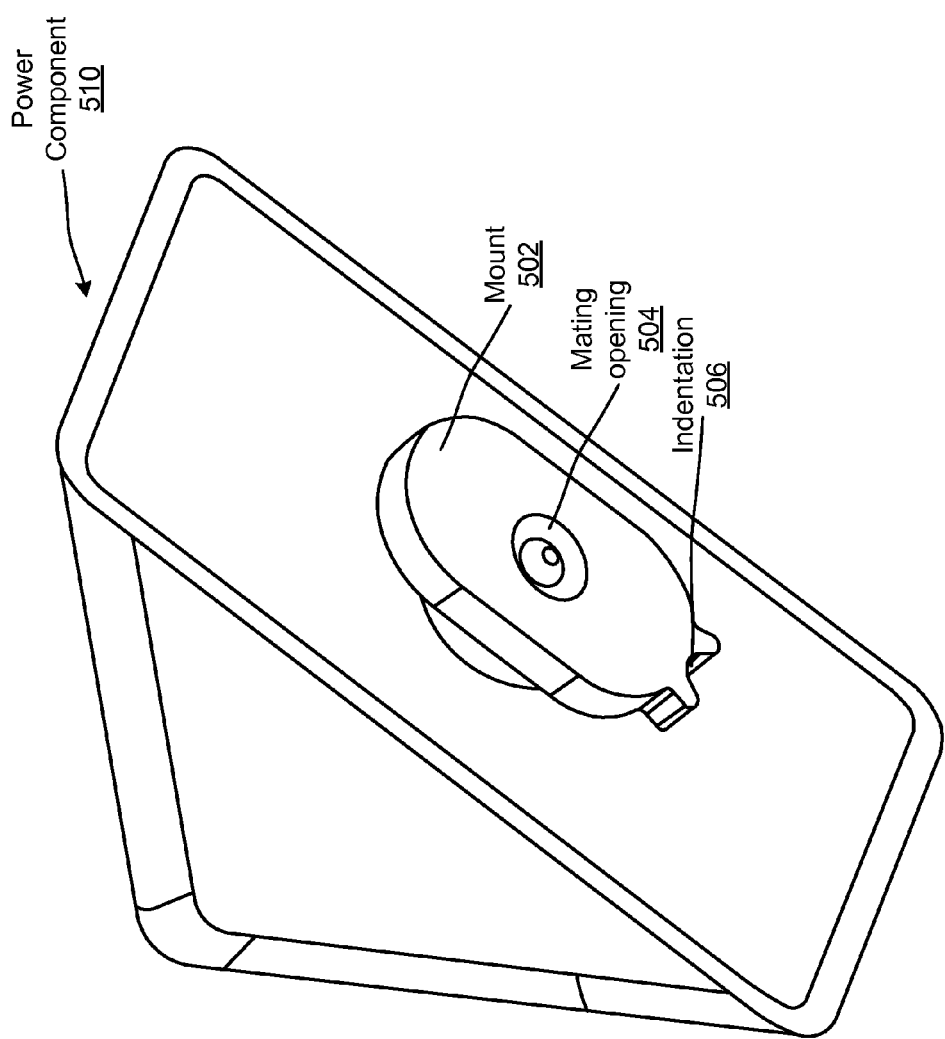
FIG. 5A is a diagram of a view of a power component that includes a mating opening included in a mount.
Figure 5B:
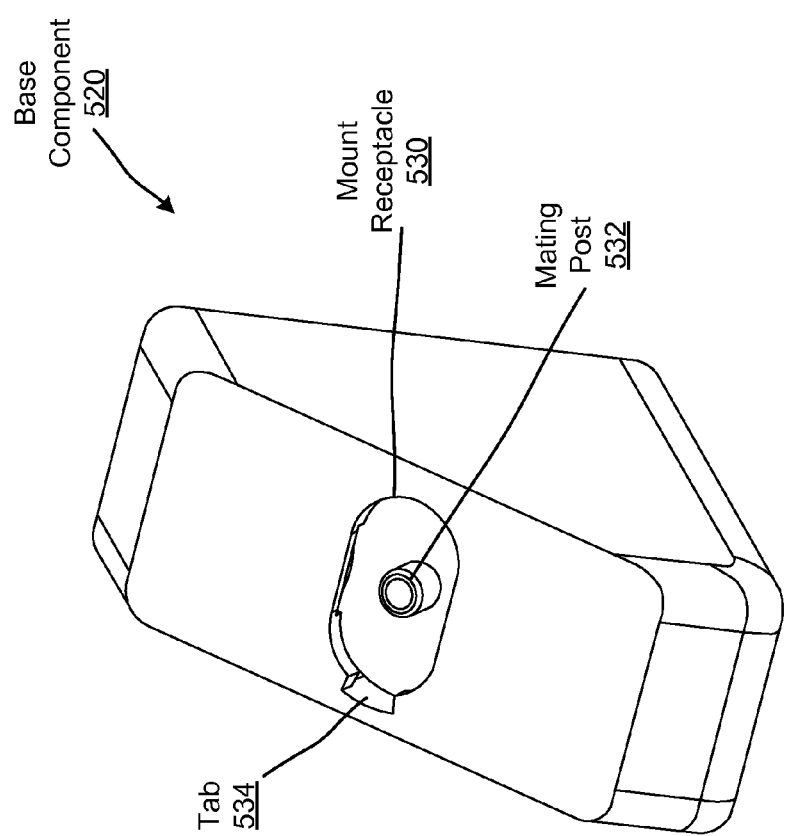
FIG. 5B is a diagram of a view of a base component that shows a mating post included in a mount receptacle.

FIG. 5A is a diagram of a view of a power component 510 that includes a mating opening 504 included in a mount 502. FIG. 5B is a diagram of a view of a base component 520 that shows a mating post 532 included in a mount receptacle 530. FIGS. 5A and 5B provide an alternate implementation of a keyed coupling mechanism for connecting the power component 510 to the base component 520. In the example shown in FIGS. 5A and 5B, the mount 502 includes an indentation 506 that allows the power component 510 to be inserted into the mount receptacle 530 in a particular orientation, based on a tab 534 included in the mount receptacle 530.

Figure 6:
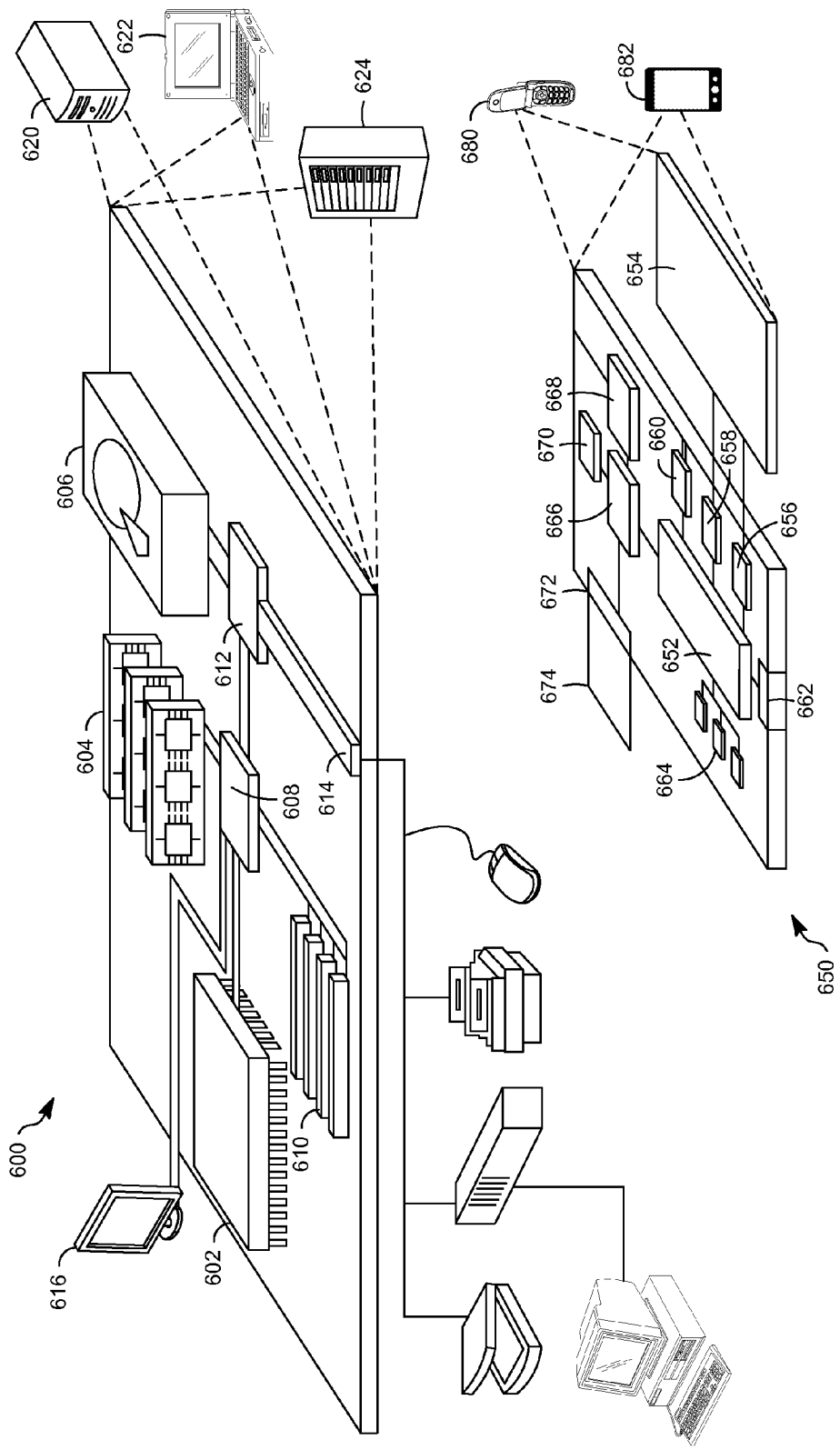
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An apparatus, comprising:
a base component including a keyed mount receptacle and a ground terminal; and
a power component having a triangular shape including:
a first side including a keyed mount and a ground contact,
a second side including at least two prongs, and
a third side,
the second side of the power component being non-parallel to the first side of the power component and the second side of the power component being perpendicular to the third side of the power component, the power component configured to be inserted into the keyed mount receptacle, the power component configured to be lockably coupled to the base component when the power component is rotated with respect to the base component, a ground contact contacting the ground terminal when the power component is rotated with respect to the base component.

2. The apparatus of claim 1, wherein the ground contact is a center contact, and the ground terminal is located in a center of the keyed mount receptacle.

3. The apparatus of claim 1, wherein the power component is configured to rotate in a clockwise direction and a counterclockwise direction with respect to the base component.

4. The apparatus of claim 1, wherein the second side of the power component includes three prongs, wherein a first prong and a second prong are configured to provide AC power to the apparatus, and wherein a third prong is configured to provide ground to the apparatus.

5. A power device comprising:
a base component including a base receptacle and keyed mount receptacle; and
a power component including a set of prongs and a keyed mount configured to be inserted into the keyed mount receptacle, wherein rotating the power component in a first direction with respect to the base component causes the set of prongs to be oriented parallel to a side of the base component that includes the base receptacle, and wherein rotating the power component in a second direction opposite the first direction causes the set of prongs to be oriented perpendicular to the side of the base component that includes the base receptacle.

6. The power device of claim 5, wherein the set of prongs are included on a first side of the power component non-parallel to a side of the power component that includes the keyed mount.

7. The power device of claim 5,
wherein the base component further includes a first terminal, a second terminal, and a ground terminal, wherein the keyed mount includes a first spring contact, a second spring contact, and a center contact,
wherein the first spring contact contacts the first terminal,
wherein the second spring contact contacts the second terminal, and
wherein the center contact contacts the ground terminal.

8. The power device of claim 5, wherein the rotating of the power component in the first direction rotates the power component in a clockwise direction with respect to the base component.

9. The power device of claim 5, wherein the rotating of the power component in the second direction rotates the power component in a counterclockwise direction with respect to the base component.

10. The power device of claim 5, wherein the power component is of a triangular shape.

11. The power device of claim 5, wherein the power component is configured to be lockably coupled to the base component when the power component is rotated with respect to the base component.

12. The power device of claim 5, wherein the set of prongs includes a first prong that is parallel to a second prong.

13. The power device of claim 12, wherein the set of prongs plug into an Alternating Current (AC) power outlet.

14. The power device of claim 13, wherein the set of prongs includes a third prong, wherein the first prong and the second prong are configured to provide AC power to the power device, and wherein the third prong is configured to provide ground to the power device.

15. The power device of claim 5, wherein the base component further includes a ground terminal, a wired contact, and a first terminal.

16. The power device of claim 15, wherein the power component further includes a ground contact and a spring contact.

17. The power device of claim 16, wherein the ground contact contacts the ground terminal and the spring contact contacts the first terminal when the power component is rotated in the first direction with respect to the base component, and wherein the contacting of the spring contact to the first terminal provides a portion of AC power to the wired contact.

18. The power device of claim 16, wherein the ground contact contacts the ground terminal and the spring contact contacts the first terminal when the power component is rotated in the second direction with respect to the base component, and wherein the contacting of the spring contact to the first terminal provides a portion of AC power to the wired contact.

* * * * *